US012547088B2

(12) United States Patent
Uno et al.

(10) Patent No.: US 12,547,088 B2
(45) Date of Patent: Feb. 10, 2026

(54) ELECTROPHOTOGRAPHIC MEMBER AND METHOD OF PRODUCING THE MEMBER, PROCESS CARTRIDGE, AND ELECTROPHOTOGRAPHIC IMAGE FORMING APPARATUS

(71) Applicant: CANON KABUSHIKI KAISHA, Tokyo (JP)

(72) Inventors: Masashi Uno, Shizuoka (JP); Ryo Sugiyama, Shizuoka (JP); Kenta Matsunaga, Shizuoka (JP); Akio Nishi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 631 days.

(21) Appl. No.: 18/055,526

(22) Filed: Nov. 15, 2022

(65) Prior Publication Data

US 2023/0161275 A1 May 25, 2023

(30) Foreign Application Priority Data

Nov. 25, 2021 (JP) ................................ 2021-191382

(51) Int. Cl.
*G03G 5/147* (2006.01)
*G03G 21/18* (2006.01)

(52) U.S. Cl.
CPC ..... *G03G 5/14791* (2013.01); *G03G 5/14704* (2013.01); *G03G 5/14734* (2013.01); *G03G 5/14769* (2013.01); *G03G 21/1803* (2013.01)

(58) Field of Classification Search
CPC ........... G03G 5/14791; G03G 5/14704; G03G 5/14734; G03G 5/14769; G03G 21/1803
See application file for complete search history.

(56) References Cited

U.S. PATENT DOCUMENTS

| | | | |
|---|---|---|---|
| 8,655,238 | B2 | 2/2014 | Uno |
| 9,921,518 | B2 | 3/2018 | Sakurai |
| 9,952,531 | B2 | 4/2018 | Ishii |
| 9,952,532 | B2 | 4/2018 | Sugiyama |
| 10,310,447 | B2 | 6/2019 | Morishita |
| 10,539,891 | B1 | 1/2020 | Ishii |

(Continued)

FOREIGN PATENT DOCUMENTS

| | | | |
|---|---|---|---|
| JP | 2000267454 A | * | 9/2000 |
| JP | 2000-310218 A | | 11/2000 |

(Continued)

OTHER PUBLICATIONS

English machine translation of the description of JP-2000267454-A (Year: 2000).*

*Primary Examiner* — Mark F. Huff
*Assistant Examiner* — Boone Alexander Evans
(74) *Attorney, Agent, or Firm* — VENABLE LLP

(57) ABSTRACT

An electrophotographic member includes an electroconductive substrate bearing a monolayer surface layer formed thereon. The surface layer has a matrix containing a cross-linked resin binder, and holds at least one particle containing an inorganic layered compound that has an ion exchange capacity. At least a portion of the particle is exposed from an outer surface of the surface layer. The matrix has an elastic modulus of at least 200 MPa, measured in a thickness direction of the surface layer from the outer surface to a depth of 0.1 μm.

8 Claims, 4 Drawing Sheets

(56) References Cited

U.S. PATENT DOCUMENTS

| | | | | |
|---|---|---|---|---|
| 10,571,825 | B1 | 2/2020 | Urushihara | |
| 10,635,019 | B2 | 4/2020 | Doi | |
| 10,642,186 | B2 | 5/2020 | Sakurai | |
| 10,678,161 | B2 | 6/2020 | Tsuru | |
| 10,705,449 | B2 | 7/2020 | Ishida | |
| 10,712,684 | B2 | 7/2020 | Wakabayashi | |
| 10,831,126 | B2 | 11/2020 | Matsunaga | |
| 10,831,127 | B2 | 11/2020 | Utsuno | |
| 10,935,903 | B2 | 3/2021 | Sugiyama | |
| 10,942,471 | B2 | 3/2021 | Ogawa | |
| 10,976,683 | B2 | 4/2021 | Ishida | |
| 11,112,718 | B2 | 9/2021 | Uno | |
| 11,465,383 | B2 | 10/2022 | Yamaguchi | |
| 2004/0082451 | A1 | 4/2004 | Miyamori | |
| 2005/0138810 | A1 | 6/2005 | Miyamori | |
| 2013/0164038 | A1 | 6/2013 | Kusaba | |
| 2013/0266339 | A1 | 10/2013 | Sugiyama | |
| 2015/0168856 | A1* | 6/2015 | Kurimoto .............. | G03G 5/142 430/57.1 |
| 2020/0004170 | A1* | 1/2020 | Ishii ..................... | G03G 5/0507 |
| 2020/0310283 | A1 | 10/2020 | Ogawa | |
| 2022/0236663 | A1 | 7/2022 | Uesugi | |
| 2022/0276579 | A1 | 9/2022 | Nishi | |

FOREIGN PATENT DOCUMENTS

| | | | |
|---|---|---|---|
| JP | 2004-145012 | A | 5/2004 |
| JP | 2009-9057 | A | 1/2009 |
| JP | 2012-189706 | A | 10/2012 |
| JP | 2016-145947 | A | 8/2016 |
| JP | 2017-173751 | A | 9/2017 |
| JP | 2020-166227 | A | 10/2020 |
| JP | 2021-67930 | A | 4/2021 |

* cited by examiner

ELECTROPHOTOGRAPHIC MEMBER AND METHOD OF PRODUCING THE MEMBER, PROCESS CARTRIDGE, AND ELECTROPHOTOGRAPHIC IMAGE FORMING APPARATUS

BACKGROUND

Technical Field

The present disclosure relates to an electrophotographic member and a method of producing the member, a process cartridge, and an electrophotographic image forming apparatus.

Description of the Related Art

An image forming process in an electrophotographic image forming apparatus includes: charging the outer surface of a photosensitive member; forming an electrostatic latent image on the charged outer surface of the photosensitive member; developing the electrostatic latent image with toner; transferring the developed toner onto recording paper; and fixation of the transferred toner with heat and a pressure. Part of the toner remaining without being transferred (hereinafter also referred to as "residual toner"), a compound produced by discharge in the charging step (hereinafter also referred to as "discharge-generated substance"), or the like may remain on the outer surface of the photosensitive member after the transfer. Such residual toner or discharge-generated substance is scraped off by a cleaning member arranged in abutment with the photosensitive member, and is removed. The foregoing is a general image forming process in the electrophotographic image forming apparatus.

To cope with a recent demand for further energy savings of the electrophotographic image forming apparatus, investigations have been made on a reduction in pressure at which the cleaning member is brought into abutment with the photosensitive member and the removal of the cleaning member. In the above-mentioned image forming process, a high frictional force occurs between the cleaning member and the photosensitive member. The reduction in pressure at which the cleaning member is brought into abutment with the photosensitive member or the removal of the cleaning member enables the rotation of the photosensitive member at a lower torque, and hence can achieve the energy savings. However, the reduction in pressure at which the cleaning member is brought into abutment with the photosensitive member or the removal of the cleaning member may cause the accumulation of the residual toner or the discharge-generated substance on the outer surface of the photosensitive member and a reduction in quality of an electrophotographic image along with the accumulation. In this connection, in Japanese Patent Application Laid-Open No. 2000-310218, there is a disclosure of a charging member whose surface layer has added thereto hydrotalcite for preventing an adverse effect of a discharge-generated substance, which has adhered to and accumulated on a contact charging member, on a photosensitive member. In addition, in Japanese Patent Application Laid-Open No. 2000-267454, there is a disclosure of an intermediate transfer member having, on its surface, a layered compound such as a hydrotalcite-like compound that physically adsorbs a discharge-generated substance. The term "discharge-generated substance" refers to, for example, a nitrogen oxide (NOx) produced by a reaction between ozone generated at the time of discharge and nitrogen in air, and includes nitric acid produced by a reaction between the nitrogen oxide and moisture in the air.

SUMMARY

At least one aspect of the present disclosure is directed to providing an electrophotographic member capable of reducing the amount of a discharge-generated substance adhering onto the outer surface of a photosensitive member to more satisfactorily suppress image smearing even in an electrophotographic image forming apparatus in which the pressure at which a cleaning member is brought into abutment with the photosensitive member is reduced or from which the cleaning member is removed. In addition, another aspect of the present disclosure is directed to providing a process cartridge conducive to stable formation of a high-quality electrophotographic image. Still another aspect of the present disclosure is directed to providing an electrophotographic image forming apparatus capable of stably forming a high-quality electrophotographic image.

According to at least one aspect of the present disclosure, there is provided an electrophotographic member including: a substrate having electroconductivity; and a monolayer surface layer on the substrate. The surface layer has a matrix containing a crosslinked resin as a binder, the surface layer holds at least one particle containing an inorganic layered compound having an ion exchange capacity so that at least a part of the at least one particle is exposed from an outer surface of the surface layer. An elastic modulus of the matrix, measured in a region of a section in a thickness direction of the surface layer from the outer surface of the surface layer to a depth of 0.1 μm, is 200 MPa or more.

In addition, according to at least one aspect of the present disclosure, there is provided a method of producing the electrophotographic member, wherein the surface layer is formed by a method including the steps (i) to (iii): (i) applying, onto a substrate having electroconductivity, a coating material for forming a crosslinked polyurethane resin layer containing a polyol, an isocyanate compound, and at least one particle containing an inorganic layered compound having an ion exchange capacity, followed by one of drying solidification or thermal curing of the coating material to form a crosslinked polyurethane resin layer; (ii) subjecting the crosslinked polyurethane resin layer to impregnation treatment with an impregnation treatment liquid containing a (meth)acrylic monomer, followed by polymerization and curing of the (meth)acrylic monomer to form a surface layer having an interpenetrating polymer network structure in which a crosslinked acrylic resin interpenetrates a crosslinked polyurethane resin; and (iii) performing UV irradiation treatment to expose at least a part of the at least one particle containing the inorganic layered compound to an outer surface of the surface layer.

In addition, according to another aspect of the present disclosure, there is provided a process cartridge detachably attachable to a main body of an electrophotographic image forming apparatus, the process cartridge including the electrophotographic member. According to still another aspect of the present disclosure, there is provided an electrophotographic image forming apparatus including: an image bearing member for bearing an electrostatic latent image; and a member to be brought into abutment with the image bearing member, wherein the member to be brought into abutment with the image bearing member is the electrophotographic member.

Further features of the present disclosure will become apparent from the following description of exemplary embodiments with reference to the attached drawings.

DESCRIPTION OF THE EMBODIMENTS

Figure 1A:
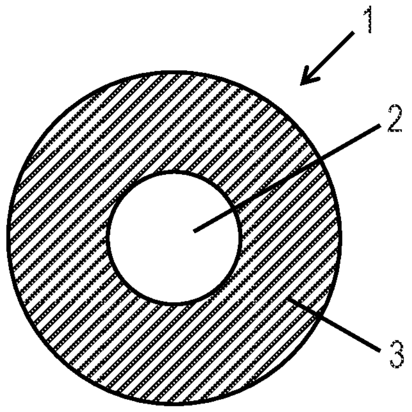
FIG. 1A and FIG. 1B are each a schematic sectional view for illustrating a developing roller according to one aspect of the present disclosure.

Even when the technology according to Japanese Patent Application Laid-Open No. 2000-310218 or Japanese Patent Application Laid-Open No. 2000-267454 is applied to an electrophotographic member, a reducing effect on the amount of a discharge-generated substance on the outer surface of a photosensitive member with which the electrophotographic member is brought into abutment has been limited. The inventors have assumed a reason for the foregoing to be as described below. A layered compound having an ion adsorption ability such as hydrotalcite can hold a nitrate ion between its layers. However, under a situation in which a larger amount of the discharge-generated substance adheres to the surface of the photosensitive member owing to a reduction in pressure at which a cleaning member is brought into abutment with the photosensitive member or the removal of the cleaning member, it may have been insufficient merely to rely on the adsorption of the discharge-generated substance by hydrotalcite on the surface of the electrophotographic member. In view of the foregoing, the inventors have made further investigations, and as a result, have found that an electrophotographic member including a surface layer having the following configuration is conducive to a further reduction in amount of the discharge-generated substance on the surface of the photosensitive member. The surface layer has a matrix containing a crosslinked resin as a binder, and holds at least one particle containing an inorganic layered compound having an ion exchange capacity such as hydrotalcite so that at least a part of the at least one particle is exposed from its outer surface, and the elastic modulus of the matrix measured in a region from the outer surface to a depth of 0.1 μm is 200 MPa or more. Here, "at least one particle" includes a plurality of particles. Further, "at least a part of the at least one particle" includes at least a part of one particle, and at least a part of each of a plurality of particles.

The inventors have assumed the reason why the electrophotographic member including such surface layer can effectively remove the discharge-generated substance on the outer surface of the photosensitive member to be as described below. The electrophotographic member is the same as the disclosure described in Japanese Patent Application Laid-Open No. 2000-310218 or Japanese Patent Application Laid-Open No. 2000-267454 in that the ability of the inorganic layered compound having an ion exchange capacity to adsorb the discharge-generated substance is used. However, in the surface layer according to one aspect of the present disclosure, the elastic modulus of the matrix measured in the outermost surface region from its outer surface to a depth of 0.1 μm is extremely as high as 200 MPa or more. The matrix showing such high elastic modulus has an extremely high crosslinking density. When the discharge-generated substance migrated from the photosensitive member adheres to the outer surface of the surface layer including such matrix, the discharge-generated substance immediately diffuses into the outer surface of the electrophotographic member. That is, the discharge-generated substance that has migrated from the photosensitive member diffuses into the periphery of the abutting portion of the electrophotographic member with the photosensitive member without staying in the abutting portion, and is adsorbed by the layered compound present around the abutting portion. Accordingly, a larger amount of the discharge-generated substance is adsorbed by the layered compound of the electrophotographic member. Probably as a result of the foregoing, even under a situation in which a larger amount of the discharge-generated substance adheres to the surface of the photosensitive member owing to a reduction in pressure at which the cleaning member is brought into abutment with the photosensitive member or the removal of the cleaning member, the amount of the discharge-generated substance on the outer surface of the photosensitive member can be reduced.

Further, the at least one particle containing the inorganic layered compound having an ion exchange capacity is held in the surface layer of the electrophotographic member according to the present disclosure so as to be exposed from the outer surface of the surface layer. The inorganic layered compound has a laminated structure in which a cation layer formed of various metal ions or complex ions obtained by the coordination of various ligands to these metal ions, and an anion layer formed of counterions thereof are alternately arranged. In addition, when the ions for forming the cation layer or the anion layer are substituted with other ions, the ion exchange capacity is exhibited. As described in the section "Description of the Related Art," the term "discharge-generated substance" refers to, for example, a NOx or nitric acid, and the discharge-generated substance adhering to the outer surface of the photosensitive member is, for example, an aqueous solution of nitric acid containing a nitrate anion. In the present disclosure, when an anion for forming the anion layer undergoes ion exchange with the nitrate anion in the discharge-generated substance, the nitrate anion is captured in the laminated structure. The capturing of the nitrate anion continues until all the anions in the anion layer are each substituted with the nitrate anion. It is assumed that when a further excess nitrate ion is present, the nitrate anion that cannot be completely captured is discharged from a terminal of the laminated structure. The discharged nitrate anion is captured in the nearby laminated structure again along the outer surface including the above-mentioned matrix. That is, the inorganic layered compound acts to transport the nitrate anion derived from the discharge-generated substance along the laminated structure, and the action may accelerate the diffusion of the discharge-generated substance toward the surface of the electrophotographic member.

It is conceived that by virtue of those effects, the discharge-generated substance efficiently migrates to the surface of the electrophotographic member to be removed from the outer surface of the photosensitive member, and as a result, a suppressing effect on the occurrence of image smearing is obtained.

[Electrophotographic Member]

The electrophotographic member according to the present disclosure may be any member as long as the member is brought into abutment with the photosensitive member that is an image bearing member. In particular, the member is preferably a member to be brought into abutment with the photosensitive member immediately after the production of the discharge-generated substance.

The present disclosure is described below by an electrophotographic member having a roller shape (hereinafter also referred to as "electrophotographic roller"), which may be suitably used as the electrophotographic member according to one aspect of the present disclosure, but the shape of the electrophotographic member is not limited thereto.

Figure 1B:
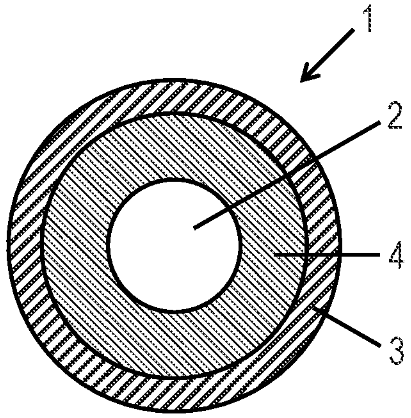

FIG. 1A is a sectional view in the circumferential direction of an electrophotographic roller 1 including a mandrel 2 serving as an electroconductive substrate and a surface layer 3 on the peripheral surface of the substrate. FIG. 1B is a sectional view in the circumferential direction of the electrophotographic roller 1 including the mandrel 2 serving as an electroconductive substrate, an intermediate layer 4 on the peripheral surface thereof, and the surface layer 3 on the peripheral surface thereof. The intermediate layer 4 is not limited to a monolayer, and may be a plurality of layers.

<1: Electroconductive Substrate>

A columnar or hollow cylindrical electroconductive mandrel, or a product obtained by further arranging one or a plurality of electroconductive intermediate layers on such mandrel may be used as a substrate having electroconductivity.

<1-1: Mandrel>

The shape of the mandrel is a columnar shape or a hollow cylindrical shape, and the mandrel includes any one of the following electroconductive materials: a metal or an alloy, such as aluminum, a copper alloy, or stainless steel; iron subjected to plating treatment with chromium or nickel; and a synthetic resin having electroconductivity. A known adhesive may be applied to the surface of the mandrel for the purpose of improving its adhesive property with, for example, the intermediate layer or the surface layer to be arranged on its outer periphery.

<1-2: Intermediate Layer>

In a nonmagnetic one-component contact development process, an electrophotographic member in which the intermediate layer is laminated between the mandrel and the surface layer is suitably used. The intermediate layer imparts, to the electrophotographic member, such hardness and elasticity that the electrophotographic member is pressed against a photosensitive member at an appropriate nip width and an appropriate nip pressure so that a toner can be supplied to an electrostatic latent image formed on the surface of the photosensitive member without excess and without insufficiency. Typically, the intermediate layer is preferably formed from a molded body of a rubber material. Examples of the rubber material include the following materials: an ethylene-propylene-diene copolymer rubber (EPDM), an acrylonitrile-butadiene rubber (NBR), a chloroprene rubber (CR), a natural rubber (NR), an isoprene rubber (IR), a styrene-butadiene rubber (SBR), a fluorine rubber, a silicone rubber, an epichlorohydrin rubber, a hydrogenated product of NBR, and a urethane rubber. Those rubber materials may be used alone or in combination thereof. Of those, a silicone rubber is particularly preferred because the rubber hardly causes a permanent compression set even when any other member (e.g., a toner-regulating member) is brought into abutment with the layer over a long time period. A specific example of the silicone rubber is a cured product of an addition-curable silicone rubber.

In the intermediate layer, the rubber material may be blended with an electroconductivity-imparting agent, such as an electronic electroconductive material or an ionic electroconductive material, as required. The volume resistivity of the intermediate layer is adjusted to preferably $10^3$ Ωcm or more and $10^{11}$ Ωcm or less, more preferably $10^4$ Ωcm or more and $10^{10}$ Ωcm or less.

Examples of the electronic electroconductive material include: electroconductive carbon blacks, such as "ketjen black" (product name, manufactured by Lion Specialty Chemicals Co., Ltd.) and acetylene black; carbon blacks for rubbers, such as SAF, ISAF, HAF, FEF, GPF, SRF, FT, and MT; carbon blacks for color inks each subjected to oxidation treatment; pyrolysis carbon black; and metals, such as copper, silver, and germanium, and metal oxides thereof.

Examples of the ionic electroconductive material include: inorganic ionic electroconductive materials, such as sodium perchlorate, lithium perchlorate, calcium perchlorate, and lithium chloride; and organic ionic electroconductive materials, such as a modified aliphatic dimethylammonium ethosulfate and stearylammonium acetate.

Each of those electroconductivity-imparting agents, which is used in an amount required to adjust the volume resistivity of the intermediate layer to such an appropriate value as described above, is typically used in an amount in the range of from 0.5 part by mass or more to 50 parts by mass or less with respect to 100 parts by mass of the rubber material.

In addition, various additives, such as a plasticizer, a filler, an extender, a vulcanizing agent, a vulcanization aid, a crosslinking aid, a curing inhibitor, an antioxidant, an age inhibitor, and a processing aid, may each be further incorporated into the intermediate layer as required. Examples of the filler include silica, quartz powder, and calcium carbonate. Those optional components are each blended in an amount in such a range that the function of the intermediate layer is not inhibited.

The intermediate layer has elasticity required for the electrophotographic member, and preferably has an Asker C hardness of 20° or more and 100° or less, and a thickness of 0.3 mm or more and 6.0 mm or less.

The respective materials for forming the intermediate layer may be mixed with a dynamic mixing device, such as a uniaxial continuous kneader, a biaxial continuous kneader, a twin roll, a kneader mixer, or Trimix, or a static mixing device such as a static mixer.

A method of forming the intermediate layer on the mandrel is not particularly limited, and examples thereof may include a mold molding method, an extrusion molding method, an injection molding method, and a coating molding method. An example of the mold molding method may be a method including: first, fixing, to both the ends of a cylindrical mold, dies for holding the mandrel in the mold; forming injection ports in the dies; then arranging the mandrel in the mold; injecting the materials for forming the intermediate layer from the injection ports; heating the mold after the injection at the temperature at which the materials cure; and removing the cured product from the mold. An example of the extrusion molding method may be a method including: coextruding the mandrel and the materials for forming the intermediate layer with a crosshead-type extruder; and curing the materials to form the intermediate layer on the periphery of the mandrel. The surface of the intermediate layer may be modified by a surface modification method, such as surface polishing, corona treatment, flame treatment, or excimer treatment, for improving its adhesiveness with the surface layer.

<2: Surface Layer>

The surface layer is a monolayer arranged on the outermost surface of the electrophotographic member. In the case of a member of a roller shape, the layer is arranged on its outermost peripheral surface. Although the surface layer may be directly formed on the mandrel, the surface layer may be formed on the outer peripheral surface of a substrate obtained by arranging the intermediate layer on the mandrel. A matrix containing a crosslinked resin as a binder and at least one particle containing an inorganic layered compound having an ion exchange capacity are incorporated into the surface layer. Further, the surface layer may be blended with an electroconductivity-imparting agent for controlling its electroconductivity or a roughening agent for controlling its surface roughness as required, or may be blended with other various additives as required to the extent that the features of the present disclosure are not impaired.

A material for forming the matrix containing the crosslinked resin as a binder is not particularly limited. However, a matrix having an interpenetrating polymer network structure (hereinafter referred to as "IPN structure") in which a crosslinked acrylic resin interpenetrates a crosslinked polyurethane resin is suitably used because of the following reasons: the matrix is excellent in triboelectric chargeability to toner and abrasion resistance; and its elastic modulus is easily designed within a desired range. That is, at least part of the outer surface of the surface layer preferably includes the matrix having the IPN structure in which the crosslinked acrylic resin interpenetrates the crosslinked polyurethane resin.

<2-1: Crosslinked Polyurethane Resin>

Examples of the crosslinked polyurethane resin include a polyether-based polyurethane resin, a polyester-based polyurethane resin, and a polycarbonate-based polyurethane resin. Those polyurethane resins may each be obtained by a reaction between a known polyol and a known isocyanate compound.

Specific examples of the polyol include, but not particularly limited to: polyether polyols, such as polyethylene glycol, polypropylene glycol, and polytetramethylene glycol; polyester polyols, such as polyethylene succinate diol, polybutylene succinate diol, polyethylene adipate diol, and polybutylene adipate diol; and polycarbonate polyols, such as polyethylene carbonate diol and polybutylene carbonate diol.

Although the isocyanate compound to be subjected to a reaction with each of those polyols is not particularly limited, for example, the following compounds may be used: aliphatic polyisocyanates, such as ethylene diisocyanate and 1,6-hexamethylene diisocyanate (HDI); alicyclic polyisocyanates, such as isophorone diisocyanate (IPDI), cyclohexane 1,3-diisocyanate, and cyclohexane 1,4-diisocyanate; aromatic isocyanates, such as 2,4-tolylene diisocyanate, 2,6-tolylene diisocyanate (TDI), 4,4'-diphenylmethane diisocyanate (MDI), polymeric diphenylmethane diisocyanate, xylylene diisocyanate, and naphthalene diisocyanate; and copolymerized products, isocyanurate forms, TMP adduct forms, and biuret forms thereof, and block forms thereof. Of those, aromatic isocyanates, such as tolylene diisocyanate, diphenylmethane diisocyanate, and polymeric diphenylmethane diisocyanate, are more suitably used.

<2-2: Crosslinked Acrylic Resin>

Although the crosslinked acrylic resin has high hardness, the resin may be hard and brittle when used alone. Accordingly, when the resin is used as a single film in the surface layer of an electrophotographic member, a flaw is liable to occur on the layer owing to its shaving by rubbing because of the brittleness. Meanwhile, when the crosslinked acrylic resin is introduced as the IPN structure with the crosslinked polyurethane resin, the resin may be suitably used as the surface layer of the electrophotographic member because its brittleness is hardly expressed. In addition, when the matrix of the surface layer is caused to have the IPN structure, its crosslinking density can be increased, and the matrix having the high crosslinking density shows the following specific surface characteristic: the infiltration of a discharge-generated substance into the member is suppressed.

The crosslinked acrylic resin (including the crosslinked methacrylic resin) is formed by the polymerization of a (meth)acrylic monomer. The term "(meth)acrylic monomer" as used herein means an acrylic monomer or a methacrylic monomer. That is, the crosslinked acrylic resin is formed by the polymerization of one or both of the acrylic monomer and the methacrylic monomer.

The IPN structure of the crosslinked acrylic resin and the crosslinked polyurethane resin is formed by impregnating a liquid (meth)acrylic monomer into a resin layer containing a crosslinked polyurethane resin and curing the impregnated product. A polyfunctional monomer having a plurality of acryloyl groups and/or methacryloyl groups as functional groups for forming a crosslinked structure is used as the (meth)acrylic monomer. Meanwhile, when the number of functional groups is four or more, the viscosity of the (meth)acrylic monomer is remarkably increased. Accordingly, the (meth)acrylic monomer is hardly impregnated into the surface of the resin layer formed of the crosslinked polyurethane resin, and as a result, the IPN structure is hardly formed. Accordingly, such a (meth)acrylic monomer that the total number of acryloyl groups and/or methacryloyl groups in one molecule is two or three is preferred as the (meth)acrylic monomer, and a bifunctional (meth)acrylic monomer having two such groups is more preferred. In addition, a monofunctional monomer may be combined with the polyfunctional monomer as required.

The average molecular weight of the (meth)acrylic monomer preferably falls within the range of from 200 or more to 750 or less. When the (meth)acrylic monomer having the average molecular weight within the range is used, the IPN structure is easily formed for the network structure of the crosslinked polyurethane resin, and hence the strength of the surface layer can be effectively improved.

As described above, the (meth)acrylic monomer is impregnated into the resin layer containing the crosslinked polyurethane resin. To that end, the (meth)acrylic monomer needs to have an appropriate viscosity. That is, when the monomer has a high viscosity, the monomer is hardly impregnated into the resin layer, and when the monomer has a low viscosity, the impregnated state is difficult to control. Accordingly, the viscosity of the (meth)acrylic monomer is preferably 5.0 mPa·s or more and 140 mPa·s or less at 25° C. The viscosity may be measured with, for example, a piston-type viscometer VISCOlab4000 (product name, manufactured by Cambridge Viscosity, Inc.).

The IPN structure of the crosslinked polyurethane resin and the crosslinked acrylic resin may be preferably formed by: selecting one or two or more kinds of (meth)acrylic monomers each satisfying the above-mentioned molecular weight range and viscosity range; impregnating the selected monomers into the resin layer containing the crosslinked polyurethane resin; and polymerizing the monomers. A method of polymerizing the (meth)acrylic monomer is not particularly limited, and a known method may be used.

Specific examples thereof include methods, such as heating and UV irradiation. A known radical polymerization initiator or ionic polymerization initiator may be used for each of the polymerization methods.

A polymerization initiator when the polymerization is performed by heating is, for example: a peroxide, such as 3-hydroxy-1,1-dimethylbutyl peroxyneodecanoate, α-cumyl peroxyneodecanoate, t-butyl peroxyneoheptanoate, t-butyl peroxypivalate, t-amyl peroxy-n-octoate, t-butyl peroxy-2-ethylhexyl carbonate, dicumyl peroxide, di-t-butyl peroxide, di-t-amyl peroxide, 1,1-bis(t-butylperoxy)cyclohexane, or n-butyl-4,4-bis(t-butylperoxy)valerate; or an azo compound, such as 2,2-azobisisobutyronitrile, 2,2-azobis(4-methoxy-2,4-dimethylvaleronitrile), 2,2-azobis(2,4-dimethylvaleronitrile), 2,2-azobis(2-methylbutyronitrile), 1,1-azobis(cyclohexane-1-carbonitrile), 2,2-azobis[2-(2-imidazolin-2-yl)propane], 2,2-azobis[2-methyl-N-(2-hydroxyethyl)propionamide], 2,2-azobis[N-(2-propenyl)-2-methylpropionamide], 2,2-azobis(N-butyl-2-methoxypropionamide), dimethyl-2,2-azobis(isobutyrate), or 4,4'-azobis(4-cyanovaleric acid) (ACVA).

A polymerization initiator when the polymerization is performed by UV irradiation is, for example, 2,2-dimethoxy-1,2-diphenylethan-1-one, 1-hydroxycyclohexyl phenyl ketone, 2-hydroxy-2-methyl-1-phenylpropan-1-one, 1-[4-(2-hydroxyethoxy)-phenyl]-2-hydroxy-2-methyl-1-propan-1-one, 2-hydroxy-1-{4-[4-(2-hydroxy-2-methyl-propionyl)-benzyl]-phenyl}-2-m ethylpropan-1-one, 2-methyl-1-[4-(methylthio)phenyl]-2-morpholinopropan-1-one, 2-benzyl-2-dimethylamino-1-(4-morpholinophenyl)-butan-1-one, 2-dimethylamino-2-(4-methylbenzyl)-1-(4-morpholin-4-yl-phenyl)-butan-1-one, bis(2,4,6-trimethylbenzoyl)-phenylphosphine oxide, or 2,4,6-trimethylbenzoyl-diphenylphosphine oxide.

Those polymerization initiators may be used alone or in combination thereof. In addition, when the total amount of a compound for forming a specific resin (e.g., a (meth) acrylic monomer having a (meth)acryloyl group) is defined as 100 parts by mass, the blending amount of the polymerization initiator is preferably 0.5 part by mass or more and 10 parts by mass or less from the viewpoint of efficiently advancing a reaction for the formation of the resin.

A known device may be appropriately used as a heating device or a UV irradiation device to be used for the polymerization. For example, an LED lamp, a high-pressure mercury lamp, a metal halide lamp, a xenon lamp, and a low-pressure mercury lamp may each be used as a light source for applying UV light. An integrated light quantity required at the time of the polymerization may be appropriately adjusted in accordance with the kinds and addition amounts of the monomer compound and the polymerization initiator to be used.

<2-3: Inorganic Layered Compound Having Ion Exchange Capacity>

The inorganic layered compound having an ion exchange capacity is a compound having a laminated structure in which a cation layer formed of various metal ions or complex ions obtained by the coordination of various ligands to these metal ions, and an anion layer formed of counterions thereof are alternately arranged. Examples of the metal ions include, but not particularly limited to, $Li^+$, $Na^+$, $K^+$, $Mg^{2+}$, $Fe^{2+}$, $Zn^{2+}$, $Ni^{2+}$, $Co^{2+}$, $Cu^{2+}$, $Al^{3+}$, $Cr^{3+}$, $Fe^{3+}$, and $Mn^{3+}$. Examples of the anions serving as the counterions thereof include a carbonate ion, a sulfate ion, a hydroxide ion, a carboxylate ion, and a halide ion. Of those, a carbonate ion or a hydroxide ion is preferred. The reason why the carbonate ion or the hydroxide ion is preferred is described below. That is, when each of those anions undergoes ion exchange with a nitrate anion derived from a discharge-generated substance to be released to the outside of the layer structure of the inorganic layered compound, the anion reacts with a proton derived from the discharge-generated substance. Specifically, the carbonate ion produces water and carbon dioxide through the following reaction formula (1), and the hydroxide ion produces water through the following reaction formula (2). However, those products vaporize into an atmosphere, and hence do not affect the surface resistance of a photosensitive member. This is why the carbonate ion or the hydroxide ion is preferred.

$$CO_3^{2-}+2H^+\rightarrow H_2O+CO_2: \qquad \text{Reaction formula (1)}$$

$$OH^-+H^+\rightarrow H_2O: \qquad \text{Reaction formula (2)}$$

In addition, the carbonate ion is particularly preferred because the ion has an ion diameter close to that of the nitrate anion that is an object of ion exchange, and hence can easily undergo ion exchange therewith.

Specific examples of the inorganic layered compound having an ion exchange capacity include: a hydrotalcite-like compound represented by the composition formula $Mg_6Al_2(CO_3)(OH)_{16}\cdot nH_2O$ and lithium aluminum oxide ($LiAlO_2$); and compounds derived from natural minerals, such as desautelsite ($Mg_6Mn_2(CO_3)(OH)_{16}\cdot 4H_2O$), iowaite ($Mg_6Fe_2(OH)_{16}Cl_2\cdot 4H_2O$), pyroaurite ($Mg_6Fe_2(CO_3)(OH)_{16}\cdot 4H_2O$), stichtite ($Mg_6Cr_2(CO_3)(OH)_{16}\cdot 4H_2O$), takovite ($Ni_6Al_2(CO_3)(OH)_{16}\cdot 4H_2O$), wermlandite ($Mg_7(Ca,Mg)(Al,Fe)_2(SO_4)_2(OH)_{18}\cdot 12H_2O$), and zaccagnaite ($Zn_4Al_2(CO_3)(OH)_{12}\cdot 3H_2O$).

The content of the inorganic layered compound having an ion exchange capacity in the surface layer is preferably 1 mass % or more and 40 mass % or less with respect to the total mass of the surface layer from the viewpoint of adjusting the hardness and resistance of the surface layer within ranges appropriate for an electrophotographic member.

<2-4: Electroconductivity-Imparting Agent>

The surface layer may be blended with an electroconductivity-imparting agent, such as an electronic electroconductive material or an ionic electroconductive material, as required. The volume resistivity of the surface layer is adjusted to preferably $10^3$ Ωcm or more and $10^{11}$ Ωcm or less, more preferably $10^4$ Ωcm or more and $10^{10}$ Ωcm or less.

Examples of the electronic electroconductive material include: electroconductive carbon blacks, such as "ketjen black" (product name, manufactured by Lion Specialty Chemicals Co., Ltd.) and acetylene black; carbon blacks for rubbers, such as SAF, ISAF, HAF, FEF, GPF, SRF, FT, and MT; carbon blacks for color inks each subjected to oxidation treatment; pyrolysis carbon black; and metals, such as copper, silver, and germanium, and metal oxides thereof.

Examples of the ionic electroconductive material include: inorganic ionic electroconductive materials, such as sodium perchlorate, lithium perchlorate, calcium perchlorate, and lithium chloride; and organic ionic electroconductive materials, such as a modified aliphatic dimethylammonium ethosulfate and stearylammonium acetate.

Those electroconductivity-imparting agents are each used in an amount required for adjusting the volume resistivity of the surface layer to such an appropriate value as described above. Typically, in the case of the electronic electroconductive material, the material is used in an amount in the range of from 1 part by mass or more to 50 parts by mass or less with respect to 100 parts by mass of the crosslinked polyurethane resin, and in the case of the ionic electroconductive material, the material is used in an amount in the range of from 0.01 part by mass or more to 20 parts by mass or less with respect to 100 parts by mass of the crosslinked polyurethane resin.

<2-5: Roughening Agent>

A roughening agent may be added to the surface layer for the purpose of forming protrusions on the surface of an electrophotographic member. For example, fine particles of a polyurethane resin, a polyester resin, a polyether resin, a polyamide resin, an acrylic resin, or a polycarbonate resin may be used as the roughening agent. The volume-average particle diameter of the fine particles is preferably 1.0 μm or more and 30 μm or less, and a surface roughness (ten-point average roughness) Rzjis formed by the fine particles is preferably 0.1 μm or more and 20 μm or less. The Rzjis is a value measured based on JIS B0601 (1994). When the surface layer is blended with the roughening agent, its blending amount may be, for example, 1 part by mass or more and 150 parts by mass or less with respect to 100 parts by mass of the crosslinked polyurethane resin.

<2-6: Various Additives>

The surface layer may be blended with various additives, such as a crosslinking agent, a crosslinking aid, a plasticizer, a filler, an extender, a vulcanizing agent, a vulcanization aid, an antioxidant, an age inhibitor, a processing aid, a dispersant, and a leveling agent, in addition to the above-mentioned components to the extent that the features of the present disclosure are not impaired.

<2-7: Method of Forming Surface Layer>

A method of forming an example of an embodiment of the surface layer in the present disclosure is described below. In the embodiment to be described herein, the surface layer has a matrix containing a crosslinked resin as a binder, and the matrix has an IPN structure in which a crosslinked acrylic resin interpenetrates a crosslinked polyurethane resin. In addition, the surface layer holds at least one particle containing an inorganic layered compound having an ion exchange capacity so that at least a part of the at least one particle is exposed from the outer surface of the surface layer. This embodiment is an example, and the surface layer of the present disclosure is not limited thereto.

The surface layer of this embodiment may be formed by a method including the following step (i) to step (iii):

(i) forming a crosslinked polyurethane resin layer;

(ii) forming a crosslinked polyurethane resin-crosslinked acrylic resin IPN structure; and (iii) exposing the at least one particle containing the inorganic layered compound.

(Step (i): Step of Forming Crosslinked Polyurethane Resin Layer)

A method of forming the resin layer containing the crosslinked polyurethane resin is not particularly limited, but a method including applying a liquid coating material to form the layer is preferred. The crosslinked polyurethane resin layer may be formed by, for example, dispersing and mixing the respective materials for forming the resin layer in a solvent to provide a coating material, applying the resultant coating material for forming the resin layer onto an electroconductive substrate, and subjecting the coating material to drying solidification or thermal curing.

The respective materials for forming the resin layer as described herein include the at least one particle containing the inorganic layered compound having an ion exchange capacity in addition to a polyol and an isocyanate compound that are raw materials for the crosslinked polyurethane resin. Further, the respective materials for forming the resin layer include, for example, the electroconductivity-imparting agent, the roughening agent, and the various additives described above as required. The solvent is preferably a polar solvent from the viewpoint of its compatibility with each of the polyol and the isocyanate compound serving as raw materials for the crosslinked polyurethane resin. Examples of the polar solvent include: alcohols, such as methanol, ethanol, and n-propanol; ketones, such as acetone, methyl ethyl ketone, and methyl isobutyl ketone; and esters, such as methyl acetate and ethyl acetate. Solvents each having high compatibility with any other material out of those solvents may be used alone or as a mixture thereof. In addition, the concentration of a solid content at the time of the preparation of the coating material, which may be freely adjusted by the mixing amount of the solvent, is preferably 20 mass % or more and 40 mass % or less from the viewpoint of uniformly dispersing the respective materials for forming the resin layer. A known dispersing device utilizing beads, such as a sand mill, a paint shaker, a dinomill, or a pearl mill, may be utilized for the dispersion and the mixing.

The application of the coating material obtained by dispersing and mixing the materials as described above onto the electroconductive substrate results in the formation of the crosslinked polyurethane resin layer containing the at least one particle containing the inorganic layered compound having an ion exchange capacity. Dip coating, ring coating, spray coating, or roll coating may be utilized as a method of applying the coating material.

The thickness of the crosslinked polyurethane resin layer thus obtained is preferably 2.0 μm or more from the viewpoint of its film strength. In addition, although the upper limit of the thickness of the surface layer is not particularly set, when a monolayer surface layer is formed on the substrate having formed thereon the intermediate layer, the upper limit is 20 μm or less, preferably 16 μm or less, more preferably 15 μm or less from the viewpoint of its flexibility. The thickness of the surface layer as used herein refers to the thickness of a portion excluding portions each protruding in a convex shape as a result of the addition of the roughening agent and the like.

(Step (ii): Step of forming Crosslinked Polyurethane Resin-Crosslinked Acrylic Resin IPN Structure)

The liquid (meth)acrylic monomer is impregnated into the crosslinked polyurethane resin layer formed as described above. The liquid (meth)acrylic monomer may be impregnated as it is, or may be impregnated as an impregnation treatment liquid appropriately diluted with any one of various solvents. When the liquid (meth)acrylic monomer is appropriately diluted with any one of the various solvents, a surface layer having more uniform surface composition is obtained. A solvent that satisfies both of an affinity for the resin layer and solubility for the (meth)acrylic monomer may be freely selected as the solvent. Examples thereof include: alcohols, such as methanol, ethanol, and n-propanol; ketones, such as acetone, methyl ethyl ketone, and methyl isobutyl ketone; and esters, such as methyl acetate and ethyl acetate. In addition, the impregnation treatment liquid may be appropriately mixed with a polymerization initiator. Although a method of impregnating the impregnation treatment liquid into the resin layer is not particularly limited, dip coating, ring coating, spray coating, roll coating, or the like may be utilized.

The surface layer may be formed by subjecting the resin layer to the impregnation treatment with the impregnation treatment liquid as described above, and then polymerizing and curing the (meth)acrylic monomer. A method for the polymerization and the curing is not particularly limited, and a known method may be used. Specific examples thereof include methods, such as heat curing and UV irradiation. Of those, UV irradiation is suitably used because of the following advantage: the "Step (iii): Step of exposing at least a part of the at least one particle containing Inorganic Layered Compound" to be described later can be performed simultaneously with the step (ii).

Through the steps as described above, the IPN structure in which the crosslinked acrylic resin is introduced in such a form as to be mutually entangled with the network structure of the crosslinked polyurethane resin can be formed.

(Step (iii): Step of Exposing at Least a Part of the at Least One Particle Containing Inorganic Layered Compound)

The at least one particle containing the inorganic layered compound having an ion exchange capacity is incorporated into the crosslinked polyurethane resin layer formed in the above-mentioned step (i). Although a method of exposing at least a part of the at least one particle containing the inorganic layered compound to the outer surface of the surface layer is not particularly limited, a method based on UV irradiation is preferred. As described above, when the acrylic resin impregnated into the resin layer is cured by the UV irradiation in the step (ii), the treatment of exposing at least a part of the at least one particle containing the inorganic layered compound can be performed simultaneously with the curing of the acrylic resin.

When the UV irradiation is performed, part of a molecular chain for forming the matrix of the outer surface of the surface layer is cleaved by the energy of UV light. Alternatively, the excitation of an oxygen molecule in air by the UV light produces an active oxygen species such as ozone, and an oxidizing action exhibited by the active oxygen species cleaves part of the molecular chain for forming the matrix of the outer surface of the surface layer. In each case, part of the matrix whose molecular chain has been cleaved vaporizes into the air. The action removes the matrix covering the at least one particle containing the inorganic layered compound to expose at least a part of the at least one particle containing the inorganic layered compound to the outer surface.

A known device may be appropriately used as a UV irradiation device. For example, an LED lamp, a high-pressure mercury lamp, a metal halide lamp, a xenon lamp, and a low-pressure mercury lamp may each be used as a light source for applying UV light. The illuminance of the UV light on the outer surface of the surface layer is preferably 10 mW/cm$^2$ or more from the viewpoint of setting the wettability of the outer surface of the surface layer to a discharge-generated substance within an appropriate range. In addition, the illuminance of the UV light on the outer surface of the surface layer is preferably set to 200 mW/cm$^2$ or less from the viewpoint that flexibility required for the electrophotographic member to serve as a member to be brought into abutment with a photosensitive member is not impaired.

In addition, the temperature of the outer surface of the surface layer at the time of its UV irradiation is preferably set to 40° C. or more, and is more preferably set to 80° C. or more from the viewpoint of setting the wettability of the outer surface of the surface layer to a discharge-generated substance within an appropriate range.

In addition, the integrated light quantity of the UV light is preferably 5,000 mJ/cm$^2$ or more in order that the impregnated acrylic resin may be sufficiently cured and at least a part of the at least one particle containing the inorganic layered compound may be sufficiently exposed.

<3: Various Measurement Methods>

<3-1: Method of Recognizing Exposure of at Least a Part of the at Least One Particle Containing Inorganic Layered Compound>

The fact that at least a part of the at least one particle containing the inorganic layered compound are exposed to the outer surface of the surface layer is recognized as described below. A sample piece including the outer surface of the produced electrophotographic member is cut out of the member, and the composition of the outer surface of the sample piece is subjected to XPS analysis with an X-ray photoelectron spectrometer (product name: VersaProbell, manufactured by ULVAC-PHI, Inc.). The XPS measurement is performed under the following conditions.

X-ray source: Al Kα ray

X-ray output: 15 kV, 25 W

Beam diameter: φ100

Measurement region: 300 μm×300 μm

The quantitative analysis of each element is performed as follows: a spectrum near the binding energy of the element is subjected to narrow scan analysis in accordance with the elemental composition of the inorganic layered compound having an ion exchange capacity; and the amount of the element is determined from the peak intensity thereof. For example, when hydrotalcite containing magnesium and aluminum is used as the inorganic layered compound having an ion exchange capacity, the element concentrations (%) of C, N, O, Mg, and Al are determined by using Cis (from 280 eV to 294 eV), $N_{1S}$ (from 392 eV to 406 eV), $O_{1S}$ (from 526 eV to 538 eV), $Mg_{2p}$ (from 44 eV to 60 eV), and $Al_{2p}$ (from 68 eV to 84 eV) peaks. The threshold of peak detection is 0.1%, and when the concentration of an element is less than 0.1%, the peak thereof is buried in background noise to preclude its discrimination. When both of Mg and Al derived from hydrotalcite are each detected at an element concentration of 0.1% or more by the foregoing procedure, it is judged that hydrotalcite is exposed to the outer surface of the surface layer.

<3-2: Method of Measuring Elastic Modulus>

Figure 4:
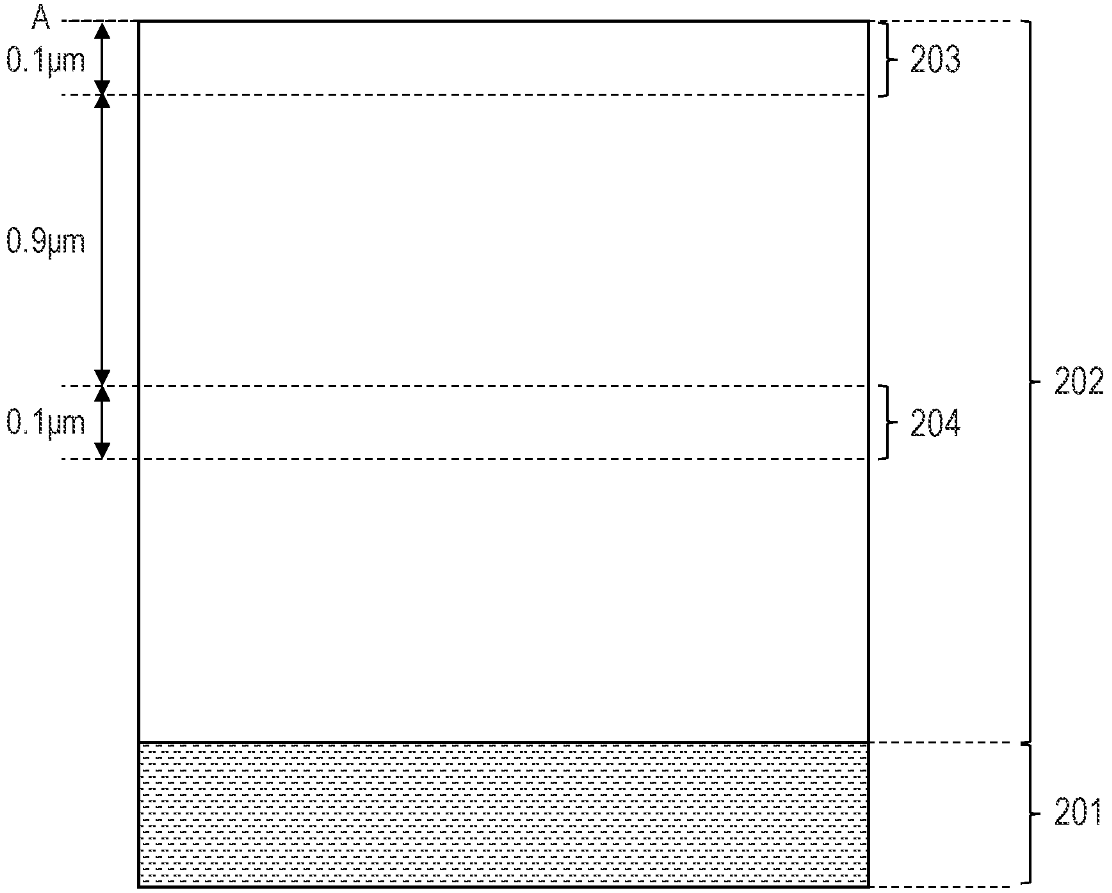
FIG. 4 is a schematic sectional view of an electrophotographic member according to one aspect of the present disclosure.

The elastic modulus of the surface layer is measured with a scanning probe microscope (SPM) as described below. First, a region of a section of an electrophotographic member to be measured for its elastic modulus is cut out into a flake with a diamond knife under a state in which the member is held at −110° C. in a cryomicrotome (product name: EM FC6, manufactured by Leica Microsystems). Further, a 100-micrometer square sample having a width of 100 μm in its depth direction is produced from the flake. Here, a schematic sectional view of a surface layer 202 formed on an electroconductive substrate 201 is illustrated in FIG. 4. In the present disclosure, as illustrated in FIG. 4, a region from an outer surface A of the surface layer 202 to a depth of 0.1 μm is specified as a first region 203, and a region corresponding to a depth of from 1.0 μm to 1.1 μm from the outer surface A of the surface layer 202 is specified as a second region 204. The elastic modulus of the matrix containing the crosslinked polyurethane resin as the binder is measured in each of the regions appearing in the section of the produced sample. A SPM device (product name: MFP-3D-Origin, manufactured by Oxford Instruments) and a probe (product name: AC160, manufactured by Olympus Corporation) are used in the measurement. At this time, the elastic modulus is calculated based on the Hertz theory by measuring a force curve 10 times, and determining the arithmetic average of 8 values excluding the highest value and the lowest value. The elastic moduli of the matrix in the first region 203 and the second region 204 are represented by E1 and E2, respectively.

In the present disclosure, the elastic modulus E1 of the matrix measured in the first region is 200 MPa or more. In addition, the elastic modulus E2 of the matrix measured in the second region is preferably 10 MPa or more and 200 MPa or less.

<3-3: Method of Measuring Contact Angle>

It is preferred that, when, in contact angle measurement with a 0.1 mol/L aqueous solution of sodium nitrate on the outer surface of the surface layer of the electrophotographic member in the present disclosure, a 1-microliter droplet of the aqueous solution is caused to impinge on the outer surface, and a contact angle 1 second after the impingement is represented by $\theta_A$(°), and a contact angle 60 seconds after the impingement is represented by $\theta_B$(°), the $\theta_A$ and the $\theta_B$ satisfy the following (formula 1) to (formula 3):

$$\theta_A \geq 95.0(°); \quad \text{(formula 1)}$$

$$\theta_B \leq 95.0)(°); \text{ and} \quad \text{(formula 2)}$$

$$\theta_A - \theta_B \geq 10.0)(°). \quad \text{(formula 3)}$$

Herein, the $\theta_A$ is an indicator representing the difficulty with which a discharge-generated substance infiltrates the outer surface of the surface layer. When the $\theta_A$ satisfies the (formula 1), the outer surface of the surface layer can sufficiently suppress the infiltration of the discharge-generated substance. The $\theta_B$ is an indicator representing whether or not the outer surface of the surface layer has an ability to diffuse the discharge-generated substance. When the $\theta_B$ satisfies the (formula 2), the outer surface of the surface layer sufficiently has an ability to diffuse the discharge-generated substance. In addition, the $\theta_A$-$\theta_B$ is an indicator representing the rate at which the discharge-generated substance diffuses on the outer surface of the surface layer. As the value of the $\theta_A$-$\theta_B$ becomes larger, the diffusion rate of the discharge-generated substance becomes faster. The $\theta_A$-$\theta_B$ preferably satisfies the (formula 3) in order that the discharge-generated substance may be efficiently removed from the top of a photosensitive member.

The contact angles may be measured with a contact angle meter DM-501 (product name, manufactured by Kyowa Interface Science Co., Ltd.). The measurement is performed under an environment having a temperature of 23° C. and a relative humidity of 50% RH. At the time of the measurement, a 1-microliter droplet of the 0.1 mol/L aqueous solution of sodium nitrate is caused to impinge on the outer surface of the electrophotographic member, and the contact angle $\theta_A$ 1 second after the impingement and the contact angle $\theta_B$ 60 seconds after the impingement are recorded.

[Method of Producing Electrophotographic Member]

As described above, in the method of producing the electrophotographic member according to one aspect of the present disclosure, the surface layer is formed by a method including the following step (i) to step (iii):

(i) applying, onto a substrate having electroconductivity, a coating material for forming a crosslinked polyurethane resin layer containing a polyol, an isocyanate compound, and at least one particle containing an inorganic layered compound having an ion exchange capacity, followed by one of drying solidification or thermal curing of the coating material to form a crosslinked polyurethane resin layer;

(ii) subjecting the crosslinked polyurethane resin layer to impregnation treatment with an impregnation treatment liquid containing a (meth)acrylic monomer, followed by polymerization and curing of the (meth)acrylic monomer to form a surface layer having an interpenetrating polymer network structure in which a crosslinked acrylic resin interpenetrates a crosslinked polyurethane resin; and (iii) performing UV irradiation treatment to expose at least a part of the at least one particle containing the inorganic layered compound to an outer surface of the surface layer.

[Process Cartridge]

Figure 2:
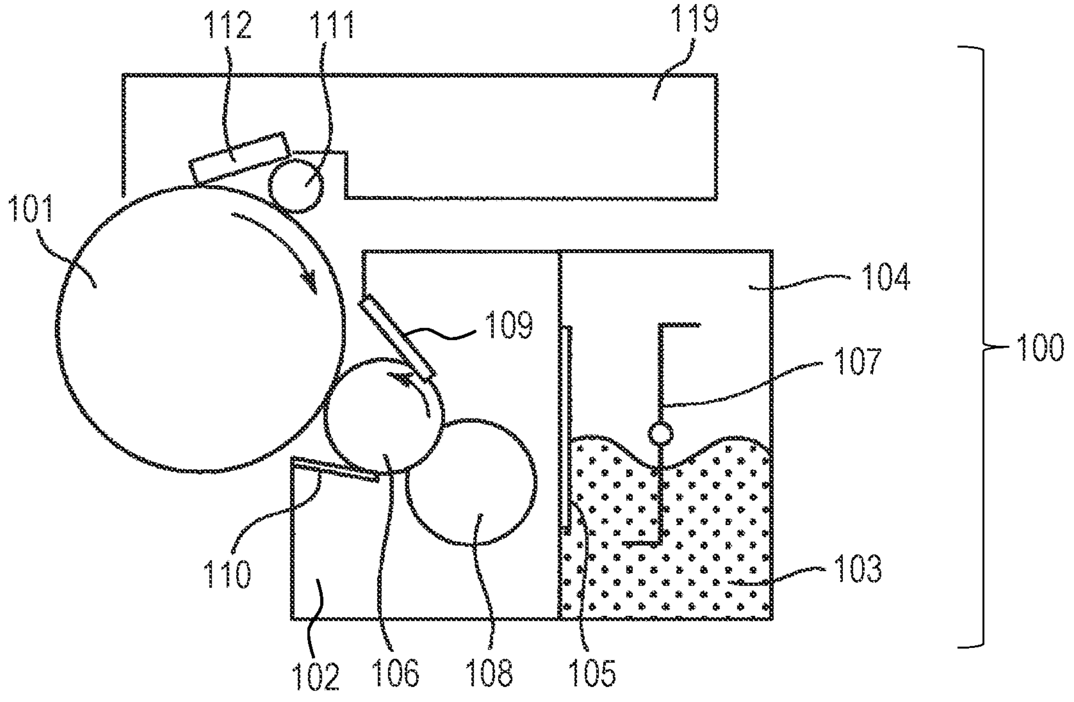
FIG. 2 is a schematic configuration view for illustrating a process cartridge according to one aspect of the present disclosure.

FIG. 2 is a schematic sectional view for illustrating a process cartridge according to one aspect of the present disclosure. A process cartridge 100 illustrated in FIG. 2 is detachably attachable to the main body of an electrophotographic image forming apparatus. The process cartridge 100 includes a developing chamber 102 having an opening portion in a portion facing a photosensitive member 101, and a toner container 104 for storing a toner 103 is arranged on the back surface of the developing chamber 102. A conveying member 107 for conveying the toner 103 to the developing chamber 102 is arranged in the toner container 104 as required. An opening portion communicating the developing chamber 102 and the toner container 104 to each other is partitioned by a sealing member 105, and the sealing member 105 is removed at the time of the start of the use of the process cartridge 100. In addition, the developing chamber 102 has arranged therein a developing roller 106, a toner-supplying roller 108, a developing blade 109, and a toner blowout-preventing sheet 110. The toner 103 is applied to the developing roller 106 by the toner-supplying roller 108. The developing roller 106 is rotated in a direction indicated by the arrow in the figure, and the toner 103 carried by the developing roller 106 is regulated into a predetermined layer thickness by the developing blade 109, and is then fed to a developing region facing the photosensitive member 101. The process cartridge 100 includes a charging roller 111, a cleaning blade 112, and a waste toner container 119 in addition to the above-mentioned configuration.

[Electrophotographic Image Forming Apparatus]

Figure 3:
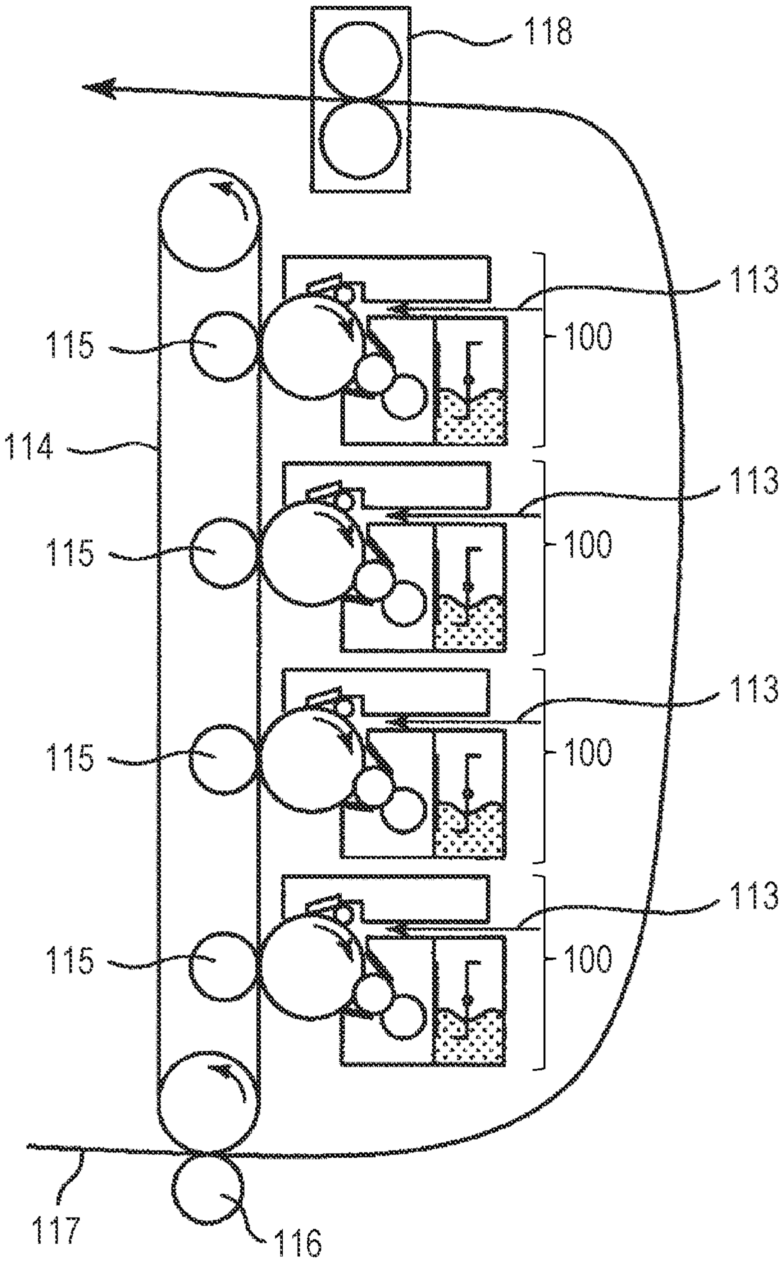
FIG. 3 is a schematic sectional view for illustrating an electrophotographic image forming apparatus according to one aspect of the present disclosure.

An electrophotographic image forming apparatus (electrophotographic apparatus) according to this aspect includes: an image bearing member for bearing an electrostatic latent image; and a member to be brought into abutment with the image bearing member, wherein the member to be brought into abutment with the image bearing member is the electrophotographic member according to the present disclosure. The member to be brought into abutment with the image bearing member may be, for example, at least one selected from the group consisting of: a charging member; a developing member; a transferring member; and a cleaning member. FIG. 3 is a schematic sectional view for illustrating the electrophotographic apparatus according to one aspect of the present disclosure. The electrophotographic apparatus may be used after having been mounted with the process cartridge 100 illustrated in FIG. 2.

The printing operation of the electrophotographic apparatus is described below. The photosensitive member 101 serving as an image bearing member is uniformly charged by the charging roller 111 connected to a bias power source (not shown). Next, an electrostatic latent image is formed on the surface of the photosensitive member 101 by exposure light 113 for writing the electrostatic latent image. LED light and laser light may each be used as the exposure light 113. Next, the toner charged to negative polarity is applied to (developed on) the electrostatic latent image by the developing roller 106 built in the process cartridge 100 detachably attachable to the main body of the electrophotographic apparatus. Next, a toner image is formed on the photosensitive member 101, and hence the electrostatic latent image is converted into a visible image. At this time, a voltage is applied to the developing roller 106 by a bias power source (not shown). The toner image developed on the photosensitive member 101 is primarily transferred onto an intermediate transfer belt 114. A primary transfer member 115 is brought into abutment with the rear surface of the intermediate transfer belt 114, and the application of a voltage to the primary transfer member 115 primarily transfers the toner image of negative polarity from the photosensitive member 101 onto the intermediate transfer belt 114. The primary transfer member 115 may have a roller shape or a blade shape.

The electrophotographic apparatus illustrated in FIG. 3 is mounted with a total of the four process cartridges 100 each containing the toner of one of the respective colors, that is, a yellow color, a cyan color, a magenta color, and a black color under a state in which the process cartridges are detachably attachable to the main body of the electrophotographic apparatus. In addition, the respective steps of charging, exposure, development, and primary transfer are sequentially performed at a predetermined time difference to establish a state in which the toner images of the four colors for representing a full-color image are superimposed on the intermediate transfer belt 114.

The toner images on the intermediate transfer belt 114 are conveyed to a position facing a secondary transfer member 116 along with the rotation of the intermediate transfer belt 114. At this time, recording paper serving as a transfer material is conveyed into a space between the intermediate transfer belt 114 and the secondary transfer member 116 at a predetermined timing along a recording paper-conveying route 117. In addition, the application of a secondary transfer bias to the secondary transfer member 116 transfers the toner images on the intermediate transfer belt 114 onto the recording paper. The recording paper onto which the toner images have been transferred by the secondary transfer member 116 is conveyed to a fixing device 118, and the toner images on the recording paper are melted to be fixed onto the recording paper. After that, the recording paper is discharged to the outside of the electrophotographic apparatus. Thus, a printing operation is completed. The toner image remaining on the photosensitive member 101 without being transferred from the photosensitive member 101 onto the intermediate transfer belt 114 is scraped off by the cleaning blade 112, and is stored in the waste toner-storing container 119.

In the electrophotographic apparatus illustrated in FIG. 3, the electrophotographic member according to the present disclosure may be used as each of, for example, the charging roller 111 serving as a charging member, the developing roller 106 serving as a developing member, the intermediate transfer belt 114 serving as a transferring member, and the cleaning blade 112 serving as a cleaning member.

According to one aspect of the present disclosure, there can be obtained the electrophotographic member capable of reducing the amount of a discharge-generated substance on the outer surface of a photosensitive member to more satisfactorily suppress image smearing even when the pressure at which a cleaning member is brought into abutment with the photosensitive member is reduced or the cleaning member is removed. In addition, according to another aspect of the present disclosure, there can be obtained the process cartridge conducive to stable formation of a high-quality electrophotographic image. According to still another aspect of the present disclosure, there can be obtained the electrophotographic image forming apparatus capable of stably forming a high-quality electrophotographic image.

EXAMPLES

Several aspects of the present disclosure are described in more detail below by taking a developing roller as an example and by giving specific Examples. The technical scope of the present disclosure serving as an electrophotographic member is not limited to those specific aspects.

<Production of Coating Material for forming Crosslinked Polyurethane Resin Layer>

[Production of Coating Material A1]

100 Parts by mass of a polyether polyol (product name: PTGL-1000, manufactured by Hodogaya Chemical Co., Ltd.), 40 parts by mass of polymeric MDI (product name: MILLIONATE MR-400, manufactured by Tosoh Corporation), 1 part by mass of a modified silicone oil (product name: TSF4445, manufactured by Momentive Performance Materials Japan LLC), 35 parts by mass of carbon black (product name: SUNBLACK X15, manufactured by Asahi Carbon Co., Ltd.), 20 parts by mass of a roughening agent (product name: DAIMICBEAZ UCN-5150, manufactured by Dainichiseika Color & Chemicals Mfg. Co., Ltd.), and 35 parts by mass of hydrotalcite (product name: DHT-4A, manufactured by Kyowa Chemical Industry Co., Ltd.) were weighed, and methyl ethyl ketone (manufactured by Kishida Chemical Co., Ltd.) was added to the materials so that a solid content concentration became 30 mass %, followed by the stirring and mixing of the materials. The mixed liquid was uniformly dispersed with a sand mill to provide a coating material A1.

[Production of Coating Materials A2 to A7]

Coating materials A2 to A7 each having a solid content concentration of 30 mass % were each obtained in the same manner as in the coating material A1 except that the blending amounts of the respective materials were changed as shown in Table 1.

TABLE 1

| | | | Coating material No. | | | | | | |
|---|---|---|---|---|---|---|---|---|---|
| Material | Product name (manufacturer) | | Coating material A1 | Coating material A2 | Coating material A3 | Coating material A4 | Coating material A5 | Coating material A6 | Coating material A7 |
| Polyol compound | PTGL-1000 (manufactured by Hodogaya Chemical Co., Ltd.) | (Part(s) by mass) | 100 | 100 | 100 | 100 | 100 | 100 | 100 |
| Isocyanate compound | MILLIONATE MR-400 (manufactured by Tosoh Corporation) | (Part(s) by mass) | 40 | 40 | 40 | 40 | 40 | 40 | 40 |
| Modified silicone oil | TSF4445 (manufactured by Momentive Performance Materials Japan LLC) | (Part(s) by mass) | 1 | 1 | 1 | 1 | 1 | 1 | 1 |

TABLE 1-continued

| Material | Product name (manufacturer) | | Coating material No. | | | | | | |
|---|---|---|---|---|---|---|---|---|---|
| | | | Coating material A1 | Coating material A2 | Coating material A3 | Coating material A4 | Coating material A5 | Coating material A6 | Coating material A7 |
| Carbon black | SUNBLACK X15 (manufactured by Asahi Carbon Co., Ltd.) | (Part(s) by mass) | 35 | 35 | 35 | 35 | 35 | 35 | 35 |
| Roughening agent | DAIMICBEAZ UCN-5150 (manufactured by Dainichiseika Color & Chemicals Mfg. Co., Ltd.) | (Part(s) by mass) | 20 | 20 | 20 | 20 | 20 | 20 | 20 |
| Inorganic layered compound having ion exchange capacity | Hydrotalcite DHT-4A (manufactured by Kyowa Chemical Industry Co., Ltd.) | (Part(s) by mass) | 35 | 2 | 130 | — | — | — | — |
| | Lithium aluminum oxide (manufactured by FUJIFILM Wako Pure Chemical Corporation) | (Part(s) by mass) | — | — | — | 35 | — | — | — |
| | Desautelsite powder (product obtained in Nakauri mine) | (Part(s) by mass) | — | — | — | — | 35 | — | — |
| | Stichtite powder (product obtained in Tasmania, Australia) | (Part(s) by mass) | — | — | — | — | — | 35 | — |

<Production of Coating Material for Acrylic Monomer Impregnation Treatment>

[Production of Coating Material B1]

5 Parts by mass of an acrylic monomer (product name: EBECRYL 145, manufactured by Daicel-Allnex Ltd.) and 0.5 part by mass of a polymerization initiator (product name: Omnirad 184, manufactured by IGM Resins B.V.) were dissolved and mixed in 94.5 parts by mass of methyl ethyl ketone (manufactured by Kishida Chemical Co., Ltd.) serving as a solvent to provide a coating material B1 for impregnation treatment.

[Production of Coating Material B2]

A coating material B2 was obtained in the same manner as in the coating material B1 except that the polymerization initiator was changed as shown in Table 2.

TABLE 2

| Material | Product name (manufacturer) | | Coating material No. | |
|---|---|---|---|---|
| | | | Coating material B1 | Coating material B2 |
| Acrylic monomer | EBECRYL 145 (manufactured by Daicel-Allnex Ltd.) | (Part(s) by mass) | 5 | 5 |
| Polymerization initiator | Omnirad 184 (manufactured by IGM Resins B.V.) | (Part(s) by mass) | 0.5 | — |
| | ACVA (manufactured by Otsuka Chemical Co., Ltd.) | (Part(s) by mass) | — | 0.5 |
| Solvent | Methyl ethyl ketone (manufactured by Kishida Chemical Co., Ltd.) | (Part(s) by mass) | 94.5 | 94.5 |

Example 1

<Production of Electroconductive Substrate>

A primer (product name: DY35-051, manufactured by Dow Corning Toray Co., Ltd.) was applied to a cored bar made of stainless steel (SUS304) having an outer diameter of 6 mm and a length of 270 mm, and was heated at a temperature of 150° C. for 20 minutes. The cored bar was arranged in a cylindrical mold having an inner diameter of 12.0 mm so as to be concentric therewith.

An addition-curable silicone rubber composition obtained by mixing materials shown in Table 3 below with a kneader (product name: Trimix TX-15, manufactured by Inoue Mfg., Inc.) as a material for an intermediate layer was injected into the mold heated to a temperature of 120° C. After having been injected, the composition was heated and molded at a temperature of 120° C. for 10 minutes, and was cooled to room temperature, followed by removal from the mold. Thus, an electroconductive substrate (elastic roller) in which an intermediate layer having a thickness of 3.0 mm was formed on the outer periphery of the cored bar was obtained.

TABLE 3

| Material | Product name (manufacturer) | Blending amount (part(s) by mass) |
|---|---|---|
| Vinyl group-containing dimethyl-polysiloxane | SF3000E (product name, manufactured by KCC Corporation, viscosity: 10,000 cP) | 100 |
| Hydrosilyl group-containing dimethyl-polysiloxane | SF6000P (product name, manufactured by KCC Corporation) | 0.5 |
| Platinum catalyst | SIP6832.2 (product name, manufactured by Gelest, Inc.) | 0.05 |
| Carbon black | DENKA BLACK Powder Product (product name, manufactured by Denka Company Limited) | 6 |

<Formation of Surface Layer>

The coating material A1 for forming a crosslinked polyurethane resin layer was applied to the elastic roller by dip coating, and was then heated at a temperature of 135° C. for 120 minutes to form a resin layer having a thickness of 15 μm on the elastic roller. Subsequently, the elastic roller having formed thereon the resin layer was immersed in the coating material B1 for acrylic monomer impregnation treatment for 5 seconds so that the acrylic monomer was impregnated into the resin layer. The elastic roller was heated at 90° C. for 1 hour so that the solvent was volatilized.

The elastic roller after the impregnation treatment was subjected to UV irradiation treatment by the following method. The elastic roller after the impregnation treatment was irradiated with UV light from a high-pressure mercury lamp (product name: HANDY TYPE UV CURING APPARATUS, manufactured by Mario Network) while being rotated. Thus, the acrylic monomer was polymerized and cured, and at the same time, the treatment of exposing hydrotalcite to the surface of the elastic roller was performed. Thus, a developing roller 1 was obtained. The UV light was applied at an illuminance of 125 mW/$cm^2$ for 120 seconds, and an atmospheric temperature at the time of the irradiation was set to 80° C. The total mass of a surface layer produced by the above-mentioned method was 250 mg, and a mass increment after the impregnation of the acrylic resin into the resin layer was 2 mg. The developing roller 1 obtained as described above was subjected to the following evaluations.

<Recognition of Exposure of at Least a Part of the at Least One Particle Containing Inorganic Layered Compound by XPS>

The exposure of at least a part of the at least one particle containing an inorganic layered compound was recognized through the calculation of the element concentrations (%) of magnesium and aluminum in the outer surface of the developing roller 1 by the above-mentioned XPS analysis method. The obtained results are shown in Table 4-1.

<Measurement of Elastic Modulus with SPM>

The elastic moduli E1 and E2 of the surface layer in its first region and second region were determined by the above-mentioned method of measuring an elastic modulus with a SPM. The obtained results are shown in Table 4-1.

<Measurement of Contact Angle>

A contact angle $\theta_A$ 1 second after the impingement of a 0.1 mol/L aqueous solution of sodium nitrate on the outer surface of the developing roller 1, and a contact angle $\theta_B$ 60 seconds after the impingement were determined by the above-mentioned method of measuring a contact angle. The obtained results are shown in Table 4-1.

<Image Smearing Evaluation>

Image smearing is an image detrimental effect resulting from a reduction in resistance of the outer surface of a photosensitive member due to the accumulation of a discharge-generated substance. In the photosensitive member whose outer surface has a reduced resistance, charge formed by exposure moves on the low-resistance outer surface to break a latent image. A site where the latent image needs to be originally developed with toner is not developed owing to the breakage of the latent image, and hence a state in which a blank dot is formed is established in some cases. The blank dot is referred to as "image smearing." The discharge-generated substance is bonded to moisture in an atmosphere to accelerate the reduction in resistance of the surface of the photosensitive member. Accordingly, the image smearing is liable to occur particularly in a high-temperature and high-humidity environment. In addition, as the potential of the latent image on the photosensitive member becomes closer to a light portion potential Vi (i.e., as the density gradation of the latent image becomes lower), the image smearing is more liable to occur. To recognize the performance of the developing roller to prevent the image smearing, an evaluation was performed by the following procedure.

A process cartridge (product name: HP 410X High Yield Magenta Original LaserJet Toner Cartridge (CF413X), manufactured by Hewlett-Packard Company) was made cleaning member-less by removing its cleaning blade for the purpose of reducing the torque of the process cartridge. Thus, the torque of the process cartridge is reduced. Meanwhile, a discharge-generated substance is liable to accumulate on the surface of the photosensitive member of the process cartridge. Next, the produced developing roller 1 was incorporated into the process cartridge, and the process cartridge was loaded into a laser beam printer (product name: Color LaserJet Pro M452dw, manufactured by Hewlett-Packard Company) that was an image forming apparatus. The laser beam printer was aged under a high-temperature and high-humidity environment (having a temperature of 30° C. and a relative humidity of 80%) for 24 hours or more. After the aging, an image having a print percentage of 1% was output on 4,000 sheets of recording paper under the environment. After that, a horizontal band gradation image (image in which horizontal bands corresponding to five-stage gradations, that is, a density of 0%, a density of 25%, a density of 50%, a density of 75%, and a density of 100% were drawn in the stated order from the uppermost portion of a page so as to have widths of 40 mm each) was printed. The printed horizontal band gradation image was evaluated for its image smearing by the following evaluation criteria. The obtained result is shown in Table 4-1. Ranks A to D are acceptable levels, and a rank E is an unacceptable level.

Rank A: No blank dots are present in all the gradations from a density of 25% to a density of 100%.

Rank B: A blank dot is observed in the gradation corresponding to a density of 25%.

Rank C: Blank dots are observed in the gradations from a density of 25% to a density of 50%.

Rank D: Blank dots are observed in the gradations from a density of 25% to a density of 75%.

Rank E: Blank dots are observed in the gradations from a density of 25% to a density of 100%.

Example 2

A developing roller 2 was produced in the same manner as in Example 1 except that in the UV irradiation treatment, the illuminance was changed to 60 mW/$cm^2$. The resultant developing roller 2 was subjected to the same measurements and evaluations as those of Example 1. The results are shown in Table 4-1.

Example 3

A developing roller 3 was produced in the same manner as in Example 1 except that in the UV irradiation treatment, the atmospheric temperature at the time of the irradiation was changed to 40° C. The resultant developing roller 3 was subjected to the same evaluations as those of Example 1. The results are shown in Table 4-1.

Example 4

A developing roller 4 was produced in the same manner as in Example 1 except that in the UV irradiation treatment, the illuminance was changed to 60 mW/$cm^2$, and the atmospheric temperature at the time of the irradiation was changed to 40° C. The resultant developing roller 4 was subjected to the same evaluations as those of Example 1. The results are shown in Table 4-1.

Example 5

A developing roller 5 was produced in the same manner as in Example 4 except that: the coating material B2 was used as a coating material for acrylic monomer impregnation treatment; and the heating treatment conditions after the impregnation treatment were set to 70° C. and 0.5 hour. The resultant developing roller 5 was subjected to the same evaluations as those of Example 1. The results are shown in Table 4-1. In this Example in which the coating material B2 containing ACVA as its polymerization initiator is used, the polymerization and curing of the acrylic monomer are completed by the heating treatment after the impregnation treatment.

Example 6

A developing roller 6 was produced in the same manner as in Example 5 except that the heating treatment conditions after the impregnation treatment were set to 70° C. and 1 hour. The resultant developing roller 6 was subjected to the same evaluations as those of Example 1. The results are shown in Table 4-1.

Example 7

A developing roller 7 was produced in the same manner as in Example 6 except that the coating material A2 was used as a coating material for forming a crosslinked polyurethane resin layer. The resultant developing roller 7 was subjected to the same evaluations as those of Example 1. The results are shown in Table 4-1.

Example 8

A developing roller 8 was produced in the same manner as in Example 6 except that the coating material A3 was used as a coating material for forming a crosslinked polyurethane resin layer. The resultant developing roller 8 was subjected to the same evaluations as those of Example 1. The results are shown in Table 4-2.

Example 9

A developing roller 9 was produced in the same manner as in Example 1 except that the coating material A4 was used as a coating material for forming a crosslinked polyurethane resin layer. The resultant developing roller 9 was subjected to the same evaluations as those of Example 1. The results are shown in Table 4-2. In this Example, lithium aluminum oxide was used as an inorganic layered compound, and hence the exposure of at least a part of the at least one particle containing the inorganic layered compound was recognized through the calculation of the element concentrations of lithium and aluminum in the outer surface of the developing roller by the XPS analysis method.

Example 10

A developing roller 10 was produced in the same manner as in Example 1 except that the coating material A5 was used as a coating material for forming a crosslinked polyurethane resin layer. The resultant developing roller 10 was subjected to the same evaluations as those of Example 1. The results are shown in Table 4-2. In this Example, desautelsite was used as an inorganic layered compound, and hence the exposure of at least a part of the at least one particle containing the inorganic layered compound was recognized through the calculation of the element concentrations of magnesium and manganese in the outer surface of the developing roller by the XPS analysis method.

Example 11

A developing roller 11 was produced in the same manner as in Example 1 except that the coating material A6 was used as a coating material for forming a crosslinked polyurethane resin layer. The resultant developing roller 11 was subjected to the same evaluations as those of Example 1. The results are shown in Table 4-2. In this Example, stichtite was used as an inorganic layered compound, and hence the exposure of at least a part of the at least one particle containing the inorganic layered compound was recognized through the calculation of the element concentrations of magnesium and chromium in the outer surface of the developing roller by the XPS analysis method.

Comparative Example 1

A developing roller 12 was produced in the same manner as in Example 1 except that none of the acrylic monomer impregnation treatment, the heating treatment after the impregnation treatment, and the UV irradiation treatment was performed. The resultant developing roller 12 was subjected to the same evaluations as those of Example 1. The results are shown in Table 4-2.

Comparative Example 2

A developing roller 13 was produced in the same manner as in Example 1 except that none of the acrylic monomer impregnation treatment and the heating treatment after the impregnation treatment was performed. The resultant developing roller 13 was subjected to the same evaluations as those of Example 1. The results are shown in Table 4-2.

Comparative Example 3

A developing roller 14 was produced in the same manner as in Example 1 except that the coating material A7 was used as a coating material for forming a crosslinked polyurethane resin layer. The resultant developing roller 14 was subjected to the same evaluations as those of Example 1. The results are shown in Table 4-2.

TABLE 4-1

| | | | Example 1 | Example 2 | Example 3 | Example 4 | Example 5 | Example 6 | Example 7 |
|---|---|---|---|---|---|---|---|---|---|
| Coating material for forming crosslinked polyurethane resin layer | Coating material No. | | Coating material A1 | Coating material A1 | Coating material A1 | Coating material A1 | Coating material A1 | Coating material A1 | Coating material A2 |
| | Inorganic layered compound | Kind | Hydro-talcite DHT-4A | Hydro-talcite DHT-4A | Hydro-talcite DHT-4A | Hydro-talcite DHT-4A | Hydro-talcite DHT-4A | Hydro-talcite DHT-4A | Hydro-talcite DHT-4A |
| | | Content [mass %] in surface layer | 15 | 15 | 15 | 15 | 15 | 15 | 1 |
| Coating material for acrylic monomer | Coating material No. | | Coating material B1 | Coating material B1 | Coating material B1 | Coating material B1 | Coating material B2 | Coating material B2 | Coating material B2 |

TABLE 4-1-continued

| | | | Example 1 | Example 2 | Example 3 | Example 4 | Example 5 | Example 6 | Example 7 |
|---|---|---|---|---|---|---|---|---|---|
| impregnation treatment | Radical polymerization initiator | Kind | Omnirad 184 | Omnirad 184 | Omnirad 184 | Omnirad 184 | ACVA | ACVA | ACVA |
| | | Content [mass %] in coating material for impregnation treatment | 0.5 | 0.5 | 0.5 | 0.5 | 0.5 | 0.5 | 0.5 |
| Heating treatment conditions after impregnation treatment | | | 90° C. and 1 hour | 90° C. and 1 hour | 90° C. and 1 hour | 90° C. and 1 hour | 70° C. and 0.5 hour | 70° C. and 1 hour | 70° C. and 1 hour |
| Conditions for UV irradiation treatment | Illuminance [mW/cm$^2$] | | 125 | 60 | 125 | 60 | 60 | 60 | 60 |
| | Integrated light quantity [mJ/cm$^2$] | | 15,000 | 15,000 | 15,000 | 15,000 | 15,000 | 15,000 | 15,000 |
| | Atmospheric temperature [° C.] at time of irradiation | | 80 | 80 | 40 | 40 | 40 | 40 | 40 |
| Measurement and evaluation results | XPS measurement | Element concentration | Mg: 1.2% Al: 0.4% | Mg: 1.0% Al: 0.4% | Mg: 1.0% Al: 0.3% | Mg: 0.9% Al: 0.3% | Mg: 0.8% Al: 0.3% | Mg: 0.9% Al: 0.3% | Mg: 0.4% Al: 0.1% |
| | SPM measurement | Elastic modulus E1 [MPa] | 712 | 393 | 486 | 202 | 356 | 519 | 494 |
| | | Elastic modulus E2 [MPa] | 21 | 15 | 16 | 10 | 197 | 410 | 408 |
| | Contact angle measurement | $\theta_A$ [°] | 95.1 | 105.1 | 101.2 | 109.8 | 110.1 | 107.9 | 105.2 |
| | | $\theta_B$ [°] | 76.5 | 83.2 | 78.5 | 93.6 | 94.1 | 93.2 | 94.9 |
| | | $\theta_A - \theta_B$ [°] | 18.6 | 21.9 | 22.7 | 16.2 | 16.0 | 14.7 | 10.3 |
| | Image smearing evaluation | | A | A | A | B | B | C | D |

TABLE 4-2

| | | | Example 8 | Example 9 | Example 10 | Example 11 | Comparative Example 1 | Comparative Example 2 | Comparative Example 3 |
|---|---|---|---|---|---|---|---|---|---|
| Coating material for forming crosslinked polyurethane resin layer | Coating material No. | | Coating material A3 | Coating material A4 | Coating material A5 | Coating material A6 | Coating material A1 | Coating material A1 | Coating material A7 |
| | Inorganic layered compound | Kind | Hydrotalcite DHT-4A | Lithium aluminum oxide | Desautelsite | Stichtite | Hydrotalcite DHT-4A | Hydrotalcite DHT-4A | — |
| | | Content [mass %] in surface layer | 40 | 15 | 15 | 15 | 15 | 15 | — |
| Coating material for acrylic monomer impregnation treatment | Coating material No. | | Coating material B2 | Coating material B1 | Coating material B1 | Coating material B1 | — | — | Coating material B1 |
| | Radical polymerization initiator | Kind | ACVA | Omnirad 184 | Omnirad 184 | Omnirad 184 | — | — | Omnirad 184 |
| | | Content [mass %] in coating material for impregnation treatment | 0.5 | 0.5 | 0.5 | 0.5 | — | — | 0.5 |
| Heating treatment conditions after impregnation treatment | | | 70° C. and 1 hour | 90° C. and 1 hour | 90° C. and 1 hour | 90° C. and 1 hour | — | — | 90° C. and 1 hour |
| Conditions for UV irradiation treatment | Illuminance [mW/cm$^2$] | | 60 | 125 | 125 | 125 | — | 125 | 125 |
| | Integrated light quantity [mJ/cm$^2$] | | 15,000 | 15,000 | 15,000 | 15,000 | — | 15,000 | 15,000 |
| | Atmospheric temperature [° C.] at time of irradiation | | 40 | 80 | 80 | 80 | — | 80 | 80 |
| Measurement and evaluation results | XPS measurement | Element concentration | Mg: 1.5% Al: 0.5% | Li: 0.4% Al: 0.5% | Mg: 1.3% Mn: 0.5% | Mg: 1.2% Cr: 0.5% | Mg: Not detected Al: Not detected | Mg: 1.2% Al: 0.4% | Mg: Not detected Al: Not detected |
| | SPM measurement | Elastic modulus E1 [MPa] | 521 | 669 | 751 | 784 | 11 | 35 | 708 |
| | | Elastic modulus E2 [MPa] | 437 | 22 | 26 | 28 | 10 | 21 | 19 |
| | Contact angle measurement | $\theta_A$ [°] | 108.3 | 96.6 | 97.1 | 96.1 | 115.4 | 86.5 | 112.5 |
| | | $\theta_B$ [°] | 90.6 | 79.1 | 80.3 | 77.5 | 113.8 | 78.2 | 107.3 |
| | | $\theta_A - \theta_B$ [°] | 17.7 | 17.5 | 16.8 | 18.6 | 1.6 | 8.3 | 5.2 |
| | Image smearing evaluation | | C | B | B | B | E | E | E |

As shown in Table 4-1 and Table 4-2, it was found that the developing rollers according to Examples 1 to 11 of the present disclosure were each able to suppress the image smearing even when used in the cleaning member-less laser beam printer. In particular, the developing rollers according to Examples 1 to 3 in each of which hydrotalcite was used as an inorganic layered compound having an ion exchange capacity, and the elastic moduli and contact angles of the surface layer fell within predetermined ranges were each able to suppress the image smearing at a higher level. Meanwhile, none of the developing rollers according to Comparative Examples 1 and 2 in each of which the elastic modulus E1 was less than 200 MPa, and the developing roller according to Comparative Example 3 free of any inorganic layered compound having an ion exchange capacity provided an image smearing-suppressing effect.

The present disclosure includes the following configurations.

[Configuration 1]

An electrophotographic member including: a substrate having electroconductivity; and a monolayer surface layer formed on the substrate, the surface layer having a matrix containing a crosslinked resin as a binder, wherein the surface layer holding at least one particle containing an inorganic layered compound having an ion exchange capacity so that at least a part of the at least one particle is exposed from an outer surface of the surface layer, and wherein an elastic modulus of the matrix, which is measured in a region of a section in a thickness direction of the surface layer from the outer surface of the surface layer to a depth of 0.1 μm, is 200 MPa or more.

[Configuration 2]

The electrophotographic member according to Configuration 1, wherein the matrix has an interpenetrating polymer network structure in which a crosslinked acrylic resin interpenetrates a crosslinked polyurethane resin.

[Configuration 3]

The electrophotographic member according to Configuration 1 or 2, wherein the inorganic layered compound having an ion exchange capacity is a hydrotalcite-like compound.

[Configuration 4]

The electrophotographic member according to Configuration 3, wherein a content of the hydrotalcite-like compound in the surface layer is 1 mass % or more and 40 mass % or less with respect to a total mass of the surface layer.

[Configuration 5]

The electrophotographic member according to any one of Configurations 1 to 4, wherein an elastic modulus of the matrix measured in a region corresponding to a depth of from 1.0 μm to 1.1 μm from the outer surface of the surface layer is 10 MPa or more and 200 MPa or less.

[Configuration 6]

The electrophotographic member according to any one of Configurations 1 to 5, wherein when, in contact angle measurement with a 0.1 mol/L aqueous solution of sodium nitrate on the outer surface of the surface layer, a 1-microliter droplet of the aqueous solution is caused to impinge on the outer surface, and a contact angle 1 second after the impingement is represented by $\theta_A$(°), and a contact angle 60 seconds after the impingement is represented by $\theta_B$(°), the $\theta_A$ and the $\theta_B$ satisfy the following (formula 1) to (formula 3):

$$\theta_A \geq 95.0; \quad \text{(formula 1)}$$

$$\theta_B \leq 95.0; \text{ and} \quad \text{(formula 2)}$$

$$\theta_A - \theta_B \geq 10.0 \quad \text{(formula 3)}$$

[Configuration 7]

A method of producing the electrophotographic member of any one of Configurations 1 to 6, wherein the surface layer is formed by a method including the following step (i) to step (iii):

(i) applying, onto a substrate having electroconductivity, a coating material for forming a crosslinked polyurethane resin layer containing a polyol, an isocyanate compound, and at least one particle containing an inorganic layered compound having an ion exchange capacity, followed by one of drying solidification or thermal curing of the coating material to form a crosslinked polyurethane resin layer;

(ii) subjecting the crosslinked polyurethane resin layer to impregnation treatment with an impregnation treatment liquid containing a (meth)acrylic monomer, followed by polymerization and curing of the (meth)acrylic monomer to form a surface layer having an interpenetrating polymer network structure in which a crosslinked acrylic resin interpenetrates a crosslinked polyurethane resin; and (iii) performing UV irradiation treatment to expose at least a part of the at least one particle containing the inorganic layered compound to an outer surface of the surface layer.

[Configuration 8]

A process cartridge detachably attachable to a main body of an electrophotographic image forming apparatus, the process cartridge including the electrophotographic member of any one of Configurations 1 to 6.

[Configuration 9]

An electrophotographic image forming apparatus including: an image bearing member for bearing an electrostatic latent image; and a member to be brought into abutment with the image bearing member, wherein the member to be brought into abutment with the image bearing member is the electrophotographic member of any one of Configurations 1 to 6.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-191382, filed Nov. 25, 2021, which is hereby incorporated by reference herein in its entirety.

What is claimed is:

1. An electrophotographic member, comprising:

a substrate having electroconductivity; and a monolayer surface layer on the substrate, the surface layer having a matrix containing a crosslinked resin as a binder;

the surface layer comprising at least one particle containing an inorganic layered compound having an ion exchange capacity, with at least a part of the particle being exposed from an outer surface of the surface layer; and an elastic modulus of the matrix being at least 200 MPa, measured in a thickness direction of the surface layer from the outer surface to a depth of 0.1 μm, wherein the inorganic layered compound is a hydrotalcite-like compound, and $$\theta A \geq 95.0$$

$$\theta B \leq 83.2 \text{ and}$$

$$\theta A - \theta B \geq 10.0$$

when θA and θB (°) are respectively contact angles one second and 60 seconds after impingement in contact angle measurement when a 1-microliter droplet of 0.1 mol/L aqueous sodium nitrate solution is caused to impinge on the outer surface.

2. The electrophotographic member according to claim 1, wherein the matrix has an interpenetrating polymer network structure in which a crosslinked acrylic resin interpenetrates a crosslinked polyurethane resin.

3. The electrophotographic member according to claim 2, wherein at least part of the outer surface of the surface layer includes the matrix having the interpenetrating polymer network structure.

4. The electrophotographic member according to claim 1, wherein a content of the hydrotalcite-like compound in the surface layer is 1 to 40 mass % with respect to a total mass of the surface layer.

5. The electrophotographic member according to claim 1, wherein the matrix has an elastic modulus of 10 to 200 MPa measured in a depth of 1.0 to 1.1 μm from the outer surface.

6. A method of producing an electrophotographic member, the electrophotographic member comprising a substrate having electroconductivity and a monolayer surface layer formed on the substrate, the surface layer having a matrix containing a crosslinked resin as a binder, the surface layer comprising at least one particle containing an inorganic layered compound having an ion exchange capacity, with at least a part of the particle being exposed from an outer surface of the surface layer, the method comprising the steps:

(i) applying onto the substrate a coating material for forming a crosslinked polyurethane resin layer containing a polyol, an isocyanate compound, and the particle, followed by drying solidification or thermal curing of the coating material to form a crosslinked polyurethane resin layer;

(ii) impregnation treating crosslinked polyurethane resin layer with a liquid containing a (meth)acrylic monomer, followed by polymerization and curing of the (meth)acrylic monomer to form a surface layer having an interpenetrating polymer network structure in which a crosslinked acrylic resin interpenetrates a crosslinked polyurethane resin; and (iii) performing UV irradiation treatment to expose at least a part of the particle to an outer surface of the surface layer, wherein an elastic modulus of the matrix is at least 200 MPa, measured in a thickness direction of the surface layer from the outer surface to a depth of 0.1 μm, the inorganic layered compound is a hydrotalcite-like compound, and $$\theta A \geq 95.0$$

$$\theta B \leq 83.2 \text{ and}$$

$$\theta A - \theta B \geq 10.0$$

when θA and θB (°) are respectively contact angles one second and 60 seconds after impingement in contact angle measurement when a 1-microliter droplet of 0.1 mol/L aqueous sodium nitrate solution is caused to impinge on the outer surface.

7. A process cartridge detachably attachable to a main body of an electrophotographic image forming apparatus, the process cartridge comprising:

an electrophotographic member, the electrophotographic member comprising a substrate having electroconductivity, the substrate bearing a monolayer surface layer formed thereon;

the surface layer having a matrix containing a crosslinked resin as a binder, the surface layer comprising at least one particle containing an inorganic layered compound having an ion exchange capacity, with at least a part of the particle being exposed from an outer surface of the surface layer; and an elastic modulus of the matrix being at least 200 MPa, measured in a thickness direction of the surface layer from the outer surface to a depth of 0.1 μm, wherein the inorganic layered compound is a hydrotalcite-like compound, and $$\theta A \geq 95.0$$

$$\theta B \leq 83.2 \text{ and}$$

$$\theta A - \theta B \geq 10.0$$

when θA and θB (°) are respectively contact angles one second and 60 seconds after impingement in contact angle measurement when a 1-microliter droplet of 0.1 mol/L aqueous sodium nitrate solution is caused to impinge on the outer surface.

8. An electrophotographic image forming apparatus comprising:

an image bearing member configured to bear an electrostatic latent image; and an electrophotographic a member configured to be brought into abutment with the image bearing member;

the electrophotographic member comprising a substrate having electroconductivity, the substrate bearing a monolayer surface layer formed thereon;

the surface layer having a matrix containing a crosslinked resin as a binder, the surface layer comprising at least one particle containing an inorganic layered compound having an ion exchange capacity, with at least a part of the particle being exposed from an outer surface of the surface layer; and an elastic modulus of the matrix being at least 200 MPa, measured in a thickness direction of the surface layer from the outer surface to a depth of 0.1 μm, wherein the inorganic layered compound is a hydrotalcite-like compound, and $$\theta A \geq 95.0$$

$$\theta B \leq 83.2 \text{ and}$$

$$\theta A - \theta B \geq 10.0$$

when θA and θB (°) are respectively contact angles one second and 60 seconds after impingement in contact angle measurement when a 1-microliter droplet of 0.1 mol/L aqueous sodium nitrate solution is caused to impinge on the outer surface.

* * * * *